Dec. 9, 1958 D. D. DUNLOP ET AL 2,863,821
PREVENTION OF COKING REACTOR CYCLONE DIPLEG PLUGGING
Filed Feb. 3, 1954 2 Sheets-Sheet 1
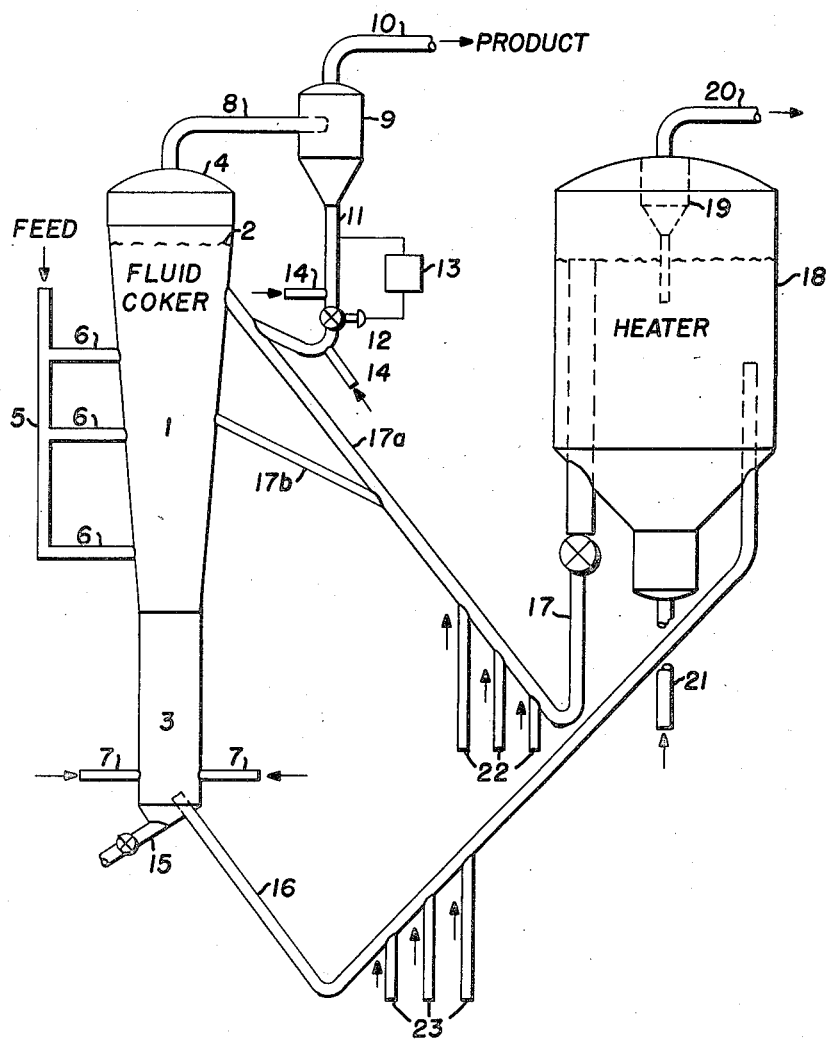
FIGURE -I
Donald D. Dunlop
William B. Segraves   Inventors
By L. Chasan  Attorney

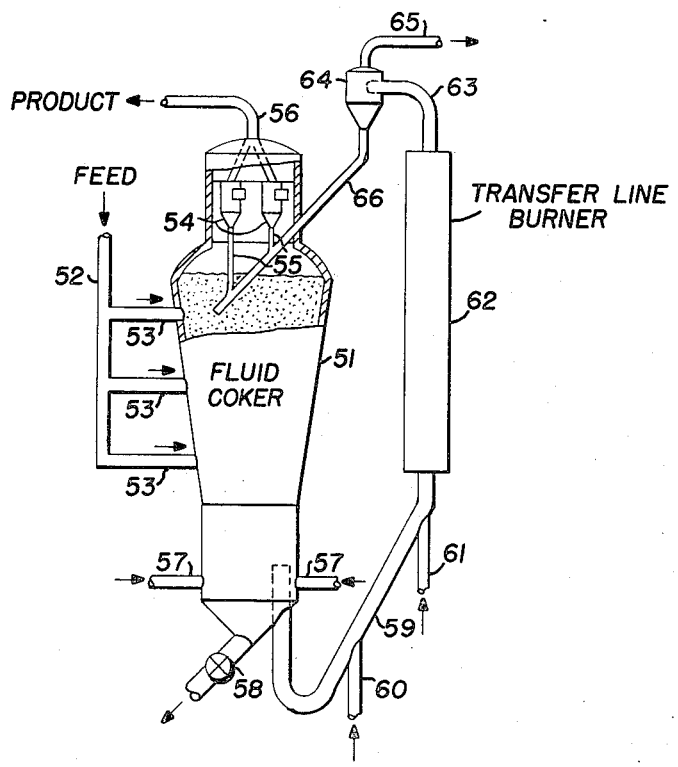
FIGURE - II
Donald D. Dunlop
William B. Seagraves   Inventors
By L. Chasan  Attorney

United States Patent Office 2,863,821
Patented Dec. 9, 1958

2,863,821

PREVENTION OF COKING REACTOR CYCLONE DIPLEG PLUGGING

Donald D. Dunlop and William B. Segraves, Baton Rouge, La., assignors to Esso Research and Engineering Company, a corporation of Delaware Application February 3, 1954, Serial No. 407,896

2 Claims. (Cl. 208—48)

This invention relates to coking of petroleum oils in contact with hot fluidized solids. More particularly, it relates to an improvement in the process and of the apparatus for the pyrolysis of heavy hydrocarbon oils by fluid coking.

A fluid coking process for upgrading heavy petroleum oils has recently been proposed. In this method, the oil, usually a residuum, to be upgraded is injected into a vessel that contains a fluid bed of high temperature particulate solids. The solid material is generally coke produced in the process, but other inert solids have been used, such as pumice, sand, spent catalyst, and the like. The solids are maintained in a fluid state by a stream of inert fluidizing gas, e. g., steam, injected at the base of the vessel. The oil upon contact with the hot solids undergoes thermolysis or pyrolysis evolving substantial proportions of hydrocarbons boiling in the gas oil and naphtha ranges and depositing carbonaceous residue on the fluid solids. This method of upgrading heavy oils has been warmly received by the art, as it is, apparently, the first method offered for continuously and efficiently coking low value petroleum residua. Copending application, entitled, "Fluid Coking of Heavy Hydrocarbons and Apparatus Therefor," Serial No. 375,088, filed August 19, 1953, by Pfeiffer et al., more fully describes this process of fluid coking.

However, in reducing this fluidized solids coking technique to practice, many difficulties have arisen. One difficulty in particular has been the reintroduction of entrained solids removed from the gaseous coker effluent into the fluid bed. The vapors arising from the fluid bed are about or near their dew point and consequently the solids separated from them are damp or in some cases wet. It has been customary to immerse the dipleg or separated solids conveying pipe from the product vapor gas solids separator or cyclone directly into the fluid bed. Apparently surges in the system drive hot particles from the fluid bed into the dipleg and this results in coking within the pipe. Consequently, there has been frequent plugging and partial stoppages of the cyclone diplegs.

This invention obviates this difficulty by connecting the cyclone dipleg to the line admitting heated solids to the coker. In conventional operations, the temperature of the bed is maintained by continuously circulating a portion of the fluid bed from the coking vessel to an external heating or combustion zone and back. The solids coming from the heating zone generally are from 100°–200° F. hotter than the solids in the fluid bed and the rate of flow of the heated solids is substantially greater, usually to 5 to 10 times greater, than the quantity of entrained solids removed in the cyclones and returned to the bed. By combining the two streams, i. e., the recycled heated solids stream and the stream of entrained solids removed from the product vapors, plugging of the cyclone dipleg is effectively prevented. The larger quantity of steadily flowing heated solids prevents back surging from the fluid bed into the line and the higher temperature of the recycled heated solids quickly dries and drives the wet solids from the dipleg, thereby preventing coking.

An object of this invention is to improve the operability of fluid coking processes pyrolytically upgrading hydrocarbon oils. Another object is to alleviate the difficulty of introducing solids from a gas-solids separator into the reaction zone of a system utilizing the fluidized solids technique. A specific object is to prevent plugging of the reactor cyclone dipleg in a residuum oil fluid coking vessel. Other objects and advantages will appear more clearly as the attached drawings, forming a part of the specification, are discussed in detail.

In Figure 1 of the drawings, a fluid coking vessel with an external product vapor cyclone is shown in conjunction with a fluid bed combustion system.

In Figure 2, a fluid coking system is shown wherein the product vapor solids-gas separators are internally located in the vessel and the temperature of the fluid bed is maintained by a transfer line burner system.

Referring to Figure 1, the coking vessel 1 has a dense bed of fluid coke particles having a pseudo-liquid level 2. A lower portion of the vessel 3 contains a stripping zone and the upper portion of the vessel 4 above the dense bed level of the unit is a solids-gas disengaging zone. The feed, for example, a vacuum residuum, is introduced at a plurality of points into the vessel by lines 6 from manifold 5. The oil upon contact with the hot coke particles undergoes thermolysis. The evolved vapors pass upward through the disengaging zone and are passed by line 8 to cyclone 9. Steam is admitted at the base of the vessel by line 7. This steam helps maintain the fluidity of the bed and also strips liquid hydrocarbons from the descending solids. Line 15 removes excess coke from the process and also the particles that have increased in size to the extent of being difficult to fluidize or non-fluidizable.

Line 16 continuously removes stripped solids from the lower portion of the vessel and transfers them to a heating or combustion zone contained in vessel 18. A fluid bed of solids is maintained in the combustion vessel by the admission of air through line 21 at the base of the vessel in amounts such that the ascending gases have a superficial fluidizing velocity of about 0.5 to 3 feet per second. This air also supports a partial combustion of the carbon particles, thereby increasing their temperature to about 1100°–1500° F. The flue gases formed by the combustion are taken off overhead through cyclone 19, which removes entrained solids, and line 20. The hot flue gases may be utilized elsewhere, as in a waste heat boiler, to recover their specific heat. Heated solids are continuously withdrawn from the combustion vessel by line 17 and transferred to the coking vessel by lines 17a and 17b.

The heating system does not, per se, form a part of this invention. Any suitable means for heating the circulated solids could be used. For example, a system as is shown in Figure 2, known as a transfer line burner system, wherein the solids are entrained in a free oxygen-containing gas and are partially combusted, is satisfactory. Also the gravitating or Thermofor type of combustion zone would be suitable. It is even feasible, in certain instances, to heat the solids by direct heat exchange with hot flue gases or indirect heat exchange with flue gases or other heating media.

The vapors removed from the fluid coker by line 8 and transferred to the solids gas separator or cyclone 9 have entrained solids removed from them, which solids pass downwardly from the cyclone through pipe 11. Vapors substantially free of solids are removed overhead from the separator by line 10 as product.

According to this invention, the solids in pipe 11, the cyclone dipleg, are admixed with the heated solids being recycled to the coking vessel. Usually the heated solids are returned to the coker through one line and are injected into the fluid bed. However, in some cases it may be desirable, from the standpoint of temperature control, to introduce the solids at a multiplicity of points into the coking vessel. It has also been suggested that the solids can be advantageously introduced into the disengaging zone 4 of the coking vessel to prevent coke deposition in line 8. It is not critical for the purpose of this invention where the solids are introduced into the coking vessel. It is sufficient that a substantial proportion of the heated solids be admixed with the separated solids in the dipleg prior to the admission of the solids to the coking zone.

Depending upon the particular process, pipe 11 may at some time become empty. In such a case, the heated solids conveying gas might possibly flow through pipe 11 and disrupt the efficiency of a cyclone. For this reason, there is shown in pipe 11 valve 12. This valve is operated by instrumentation system 13. By this means solids can be held up in pipe 11 to create a static pressure sufficient to prevent the flow of gas from pipe 17 to pipe 11.

It is to be understood that the point where the solids in the dipleg are introduced into the heated solids riser will vary with the particular process and will depend upon the pressure balance necessary for the system and other considerations.

The method of fluidized solids circulation is well known in the prior art and has not been elaborately presented here. It is customary to introduce into the uprising lines conveying particulate solids aerating gas. For this reason, a plurality of lines 22 and 23 have been shown as introducing aerating gas, e. g. steam, into risers 17 and 16 respectively. Also it may be necessary by lines 14 to introduce aerating gas into dipleg 11 to mobilize and promote the flow of solids in that line.

Figure 2 is used to show that the invention is capable of use when the reactor cyclones are internally located. Also it depicts an alternate method of heating the solids, i. e. a transfer line burner. Briefly, the feed is injected into the vessel from line 52 by lines 53. Fluidized steam is introduced into the base of the vessel by lines 57. Product coke is removed by line 58. The vapors pass through cyclone 54 and are transferred by line 56 to other processes such as fractionation, not shown.

A portion of the fluid bed is continuously withdrawn, by line 59, and passed to transfer line burner 62. Aerating gas is admitted to line 59 by line 60. Air is admitted to the transfer line burner by line 61 and conveys the solids through the burner by entrainment at a velocity of about 20–80 feet per second, preferably 30 feet per second. The air supports partial combustion of the solids, raising the temperature to about 1200° F. Line 63 introduces the heated solids and flue gas from the combustion into cyclone 64. The separated flue gas is removed from the cyclone by line 65. The heated solids pass downwardly from the cyclone through line 66 into the fluidized reaction bed. Lines 55 connect cyclones 54 to the hot solids return line 66.

Having described this invention, it is to be understood that it is not to be limited by the description, but is capable of wider application. For example, although a fluid coking system has been described, it is conceivable that the invention is applicable to fluid catalytic systems, wherein the same type of difficulty may be encountered. Also, it has been proposed to use a heavy heat carry particulate solid, such as iron shot, rather than the process coke, as the circulating heat carry medium. In such a case, the cyclone dipleg would be connected to the heated solids conduit returning the heat carrier from the heater to the fluid bed.

What is claimed is:

1. In a heavy hydrocarbon oil fluid coking process wherein heavy hydrocarbon oil is separately injected into a dense fluidized turbulent bed of high temperature coke particles in a coking zone and coke particles are continuously withdrawn and at least partially burned in an external burning zone and the coke particles heated to a temperature of about 100° F. to 200° F. higher than the coke particles in said turbulent fluid coking bed are continuously recycled to said coking zone to maintain a coking temperature in said fluidized turbulent bed therein and gaseous products are passed overhead through a gas-solids separation zone to remove entrained solids from said gaseous products and the separated solids are returned to said dense fluidized turbulent bed as a generally downwardly moving confined column maintained in a fluid condition and coking and plugging and partial stoppage of the moving confined column may occur due to hydrocarbon-wet solids therein, the improvement which consists in admixing heated coke particles consisting essentially of at least part of the heated coke particles being recycled to said coking zone with said moving confined column before the heated coke particles being recycled are discharged into said coking zone to heat the coke particles in said moving confined column to a drying temperature to avoid coking of the particles in said moving confined column and to maintain steadily flowing heated coke particles being recycled to said coking zone and so preventing back surging from said turbulent fluid coking bed to said moving confined column and using the heated coke particles being recycled in an amount of about 5 to 10 times greater than the amount of coke particles being returned to said fluid coking bed as said moving confined column from said gas-solids separation zone.

2. In a heavy hydrocarbon oil fluid coking process wherein heavy hydrocarbon oil is separately injected at least as one stream into a dense fluidized turbulent bed of high temperature coke particles in a coking zone and coke particles are continuously withdrawn and at least partially burned in an external burning zone and the coke particles, heated to a temperature of about 100° F. to 200° F. higher than the coke particles in said turbulent fluid coking bed are continuously recycled to said coking zone to maintain a coking temperature in said fluidized turbulent bed therein and gaseous products are passed overhead through a gas-solids separation zone to remove entrained solids from said gaseous products and the separated solids are returned to said dense fluidized turbulent bed as a generally downwardly moving confined column maintained in a fluid condition and coking and plugging and partial stoppage of the moving confined column may occur due to hydrocarbon-wet solids therein, the improvement which consists in admixing a substantial portion of only the heated coke particles being recycled to said coking zone with the moving confined column before the heated coke particles being recycled are discharged into said coking zone sufficient in an amount to heat the coke particles in said moving confined column to a drying temperature to avoid coking of the particles in said moving confined column and to maintain steadily flowing heated coke particles being recycled to said coking zone and so preventing back surging from said turbulent fluid coking bed to said moving confined column.

References Cited in the file of this patent

UNITED STATES PATENTS

| | | |
|---|---|---|
| 2,378,542 | Edmister | June 19, 1945 |
| 2,378,607 | Watts | June 19, 1945 |
| 2,388,055 | Hemminger | Oct. 30, 1945 |
| 2,394,928 | Martin | Feb. 12, 1946 |
| 2,618,544 | Fischer et al. | Nov. 18, 1952 |
| 2,619,473 | Wurth et al. | Nov. 25, 1952 |